United States Patent [19]

Pammer et al.

[11] 4,047,442

[45] Sept. 13, 1977

[54] APPARATUS FOR ADJUSTING THE ROTATIONAL SPEED OF A DRIVE MECHANISM

[75] Inventors: Gottfried Pammer, Maria Enzersdorf, Sudstadt; Rudolf Kvasnicka, Baden, both of Austria

[73] Assignees: Karl Vockenhuber; Raimund Hauser, both of Vienna, Austria

[21] Appl. No.: 699,458

[22] Filed: June 24, 1976

[30] Foreign Application Priority Data

June 26, 1975 Austria .................................. 4929/75

[51] Int. Cl.[2] ...................... F16H 15/08; F16H 15/10; F16H 15/12
[52] U.S. Cl. ......................................... 74/194; 74/207
[58] Field of Search ................. 74/194, 196, 197, 207, 74/210, 211, 213

[56] References Cited

U.S. PATENT DOCUMENTS

| 1,397,296 | 11/1921 | Schaf, Jr. et al. | 74/194 |
| 1,811,465 | 6/1931 | Geloso | 74/194 |
| 2,273,121 | 2/1942 | List | 74/210 |
| 3,125,284 | 3/1964 | Lawler | 74/194 |
| 3,496,943 | 2/1970 | Mueller et al. | 74/213 |

FOREIGN PATENT DOCUMENTS

| 243,616 | 11/1965 | Austria | 74/194 |
| 180,782 | 1/1936 | Sweden | 74/210 |

*Primary Examiner*—Samuel Scott
*Assistant Examiner*—Allan R. Burke
*Attorney, Agent, or Firm*—Fleit & Jacobson

[57] ABSTRACT

The invention concerns a device for adjusting the rotational speed of a drive mechanism preferably of the type used in a movie projector and provided with a drive motor having a stationary fixed stator, a rotor rotating in only one direction and connected to a friction wheel with at least one, preferably two, oppositely disposed friction discs fixed on a drive shaft for driving engagement with the friction wheel, the friction wheel being adjustable with respect to the friction discs in a radial direction to thereby adjust the rotational speed of the driving mechanism.

6 Claims, 1 Drawing Figure

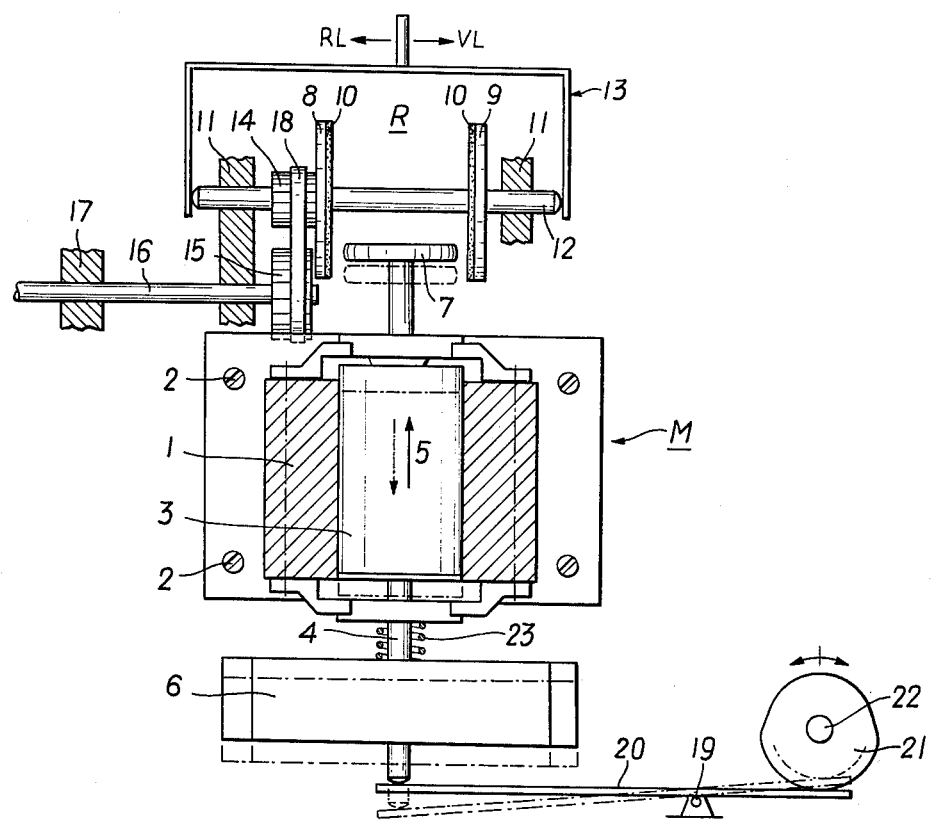

APPARATUS FOR ADJUSTING THE ROTATIONAL SPEED OF A DRIVE MECHANISM

BACKGROUND OF THE INVENTION

Tape recorders with reversible friction wheel drives for both reels wherein the drive motor is pivoted are well known. It has already been proposed to incline the drive motor of a record player to adjust the rotational speed of the turntable around an axis running parallel to the rotor axis. Up to now, such a design appeared to be inapplicable to projectors, since in the case of projectors, the motor is also required to drive a relatively powerful, cooling blower for the film stage, the lighting system, etc. Thus, substantially more complicated arrangements have been employed wherein the motor is rigidly connected to the apparatus and both friction discs are arranged in a shiftable manner on a gear shift. The control of these friction discs was, of necessity, a relatively high cost construction.

It was further proposed in the case of narrow film projectors to fix the drive motor in a swiveling manner around an axis running normal to the motor axis and normal to the axis of the friction discs, whereby the axis of rotation of the motor is arranged in the area of the fan baffles and the ventilator housing is arranged as a part of the projector housing.

In the case of more precise projectors, there is also the requirement of having two different rotational speeds available for the film drive with one drive motor. Up to now, electrical regulating devices have been utilized for the motor which were disliked, however, because of their small efficiency and often low rotational speed stability. Also, the use of the aforementioned fricton wheel gears with radial shifting of the friction wheel with reference to the friction discs has been considered as a possible solution. The technical results of this consideration known up to now, however, increased the already considerable and complicated construction costs.

SUMMARY OF THE INVENTION

The invention now provides a solution, for example, for narrow film projectors of the type mentioned at the outset, in which the rotor and stator are movable relative to each other in a known manner and an adjusting mechanism operating in the axial direction of the rotor shaft is provided for shifting the rotor relative to the stationary stator whereby in the first switch position of the adusting mechanism, the friction wheel fixed to the rotor shaft can be drivably engaged in an initial radial position with a friction disc and, in a second switch position, the friction wheel can be drivably engaged with a friction disc in a second radial position.

In this manner, the drive motor itself can remain stationary, which greatly reduces the construction costs regardless of whether the motor also drives a fan and how it is accomplished.

Swiss Pat. No. 180,782 discloses a driving mechanism for a coupling arranged in a movie projector where the drive mechanism includes a stator axially adjustable on the motor shaft of the drive motor. With stator windings having current flowing through them and due to the magnetic attraction, the rotor is automatically adjusted to the position in which the magnetic force lines between the stator and the rotor must cover the shortest possible path in the air gap. The moveable mounting of the motor, as referred to at the offset, is necessary with this construction. Since with high rotational speeds the motor tends to vibrate, this type of stator mounting not only has a short life, but also no definite transmission of the drive moment to the couplings can take place. These disadvantages are eliminated by the stationary mounting of the stator in the mechanism according to the invention.

Furthermore, there is the advantage obtained with the invention in that the rotational speed switching can be made with a more easy action because only the symmetrical force between the rotor and the stator of the motor must be overcome, which is small in the case of the relatively small adjustment paths between, for example, 18 and 24 pictures/second representing the rotational speed range of this type of projector generally required in practice.

Moreover, the expensive sliding arrangement between the friction wheel and the motor shaft is eliminated as well as the efficiency losses in the form of friction which had to be contended with.

A certain efficiency loss results in the case of a rotor which is adjustable with respect to the plane of symmetry of the stator. However, this can be accepted because the power requirement of a projector at low rotational speeds is about 15% lower than those of a higher rotational speed in the framework of the given values. According to one embodiment of the invention, however, the efficiency loss can be avoided if the parts generating the electromagnetic field of the electric motor are of a size so as to extend around the displacement path of the rotor. An especially advantageous embodiment of the invention results when the rotor is designed somewhat longer around its displacement path than the stator of the electric motor.

In accordance with the invention, for moving the rotor of the drive motor into a selected relative position between the stator and rotor, and adjustment mechanism is provided which forcibly produces a position change of the rotor. Advantageously, the adjustment mechanism includes a stopping lever adjacent one end of the rotor shaft and a compression spring yieldingly acting against this lever. With this simple arrangement, the stopping lever effectively provides an adjustment of the rotor from the symmetrical position with reference to the stator while the compression spring performs a resetting of the rotor position. However, the compression spring can be dispensed with if the symmetrical force is used as the resetting force.

An eccentric which engages the stopping lever is sufficient for adjusting the position of the stopping lever.

In order to obtain a change in the rotational direction of the output drive at the same time, axial adjustment of the friction discs is necessary which can be accomplished with conventional component parts. A simple belt drive is adequate for transmitting the rotation of the friction disc shaft, which as is well known, permits a certain lateral shifting. However, a construction in which the adjustable shaft of the friction discs is connected with another drive shaft by means of gear wheels of sufficient width is more reliable, in the instant case, with the use of a toothed belt operating together with both gear wheels.

BRIEF DESCRIPTION OF THE DRAWING

An embodiment of the invention is shown by means of the drawing. The only FIGURE in the drawing is a schematic representation, in elevation, of a drive arrangement according to the invention.

DESCRIPTION OF THE PREFERRED EMBODIMENT

A stator 1 of a drive motor M is fastened with screws 2 to a projector housing which has not been shown for clarity. A rotor 3 is disposed within stator 2 in the well known manner with its shaft 4 arranged for longitudinal movement. The movement of shaft 4 is indicated by the two arrows 5. A fan blade 6 is secured to one end of shaft 4.

A friction wheel 7 of a reverse friction gear R is secured to the other end of shaft 4. The friction wheel 7 projects into the space between two friction discs 8 and 9, which are provied with a friction-increasing lining 10 on the surfaces facing the friction wheel 7. The periphery of the friction wheel 7 can also be provided with such a friction-increasing lining. The friction discs 8 and 9 are mounted on a shaft 12 mounted for axial movement in bearing 11 and in a spaced relationship so that either one or the other friction disc 8 and 9 can be brought into contact with the friction wheel 7. The shifting of the friction discs 8, 9 is accomplished by means of a fork-like unit 13 shown schematically having arms which are engageable with the ends of shaft 12. The arrows RL and VL indicate the direction of movement of the unit 13.

Parallel to shaft 12, another shaft 16 is provided supported in bearing 17 and from which output rotation of the drive can be taken in an unchangeable rotational direction and with a variable rotational speed. Gear wheels 14 and 15 are located on shafts 12 and 16 which are connected to each other by a toothed belt 18. The width of these gear wheels 14, 15 is selected so that the toothed belt 18 is maintained in engagement with both gear wheels 14, 15 in any shifted position brought about by unit 13.

The end of the motor shaft 5 on which fan 6 is mounted is arranged to be engaged by the end of a lever 20 which is pivotally mounted on a center of rotation 19. This lever 20 has its other end arranged for engagement with the periphery of a trip cam 21 which can be rotated by means of a handle (not shown) around its axis 22 in the direction of the double arrows. A spiral compression spring 23 yieldingly urges shaft 4 out of motor M.

In the solid line position of these aforementioned parts, the rotor 3 is pressed out of the stator 1 by lever 20 in the direction of solid arrow 5, and the friction wheel 7 is positioned in a first radial position with respect to the shaft 12 and the friction discs 8, 9. If either friction disc 8 or 9 is pressed against the friction wheel 7, then the shafts 12 and 16 rotate with a certain rotational speed in the one or the other rotational direction.

If the position of the aforementioned parts is changed into the broken line position by movement of the trip cam 21 into the broken line position, then the friction wheel 7 is moved into a second radial position with respect to the shaft 12 and friction discs 8, 9 under the biasing action of spring 23. The result is that the contact radius of friction wheel 7 with respect to friction discs 8 and 9 is increased, i.e., the rotational speed of the shafts 12 and 16 is reduced (in either rotational directions) while the longitudinal speed of the motor M remains the same.

As was stated at the outset, the resetting or adjustment of the motor rotor can be carried out in different ways. As is known, an alternating current, synchronous motor is advantageously suitable as a drive motor M. If this motor can be operated with different frequencies, for example, 60 or 50 Hz, then the same rotational speed can be established with suitable replacement of gear wheels 14 and 15.

What is claimed is:

1. Apparatus for adjusting the rotational speed of a drive mechanism of the type incorporated in a movie projector or the like, comprising, in combination, a drive motor having a stationary mounted stator and a rotor including a shaft rotating in one direction with said rotor and stator arranged for relative movement, a rotatably mounted drive shaft, at least one friction disc mounted on said drive shaft,
    a friction wheel mounted on said rotor for movement by said rotor in a radial direction with respect to said friction disc, an adjustment mechanism engageable with said motor shaft in an axial direction for moving said rotor with respect to said stationary stator for driving engagement between said friction wheel and said friction disc in either a first or second radial position with respect to said disc for adjusting the rotational speed of the drive mechanism.

2. Apparatus according to claim 1 wherein said adjustment mechanism includes a stopping lever for engagement with one end of said rotor shaft and a compression spring for yieldingly opposing the action of said stopping lever.

3. Apparatus according to claim 1 wherein said adjustment mechanism includes a stopping lever for engagement with one end of said rotor shaft while the symmetry force operating magnetically between said rotor and stator opposes the action of said stopping lever.

4. Apparatus according to claim 2 including a trip cam for actuating said adjustment mechanism.

5. Apparatus according to claim 1 wherein the parts generating the electromagnetic field of said motor are of an elongated size around the displacement path of the rotor.

6. Apparatus according to claim 5 wherein said rotor has a greater length around its displacement path than the stator of said motor.

* * * * *